US012749834B2

(12) United States Patent
Stadler et al.

(10) Patent No.: US 12,749,834 B2
(45) Date of Patent: Sep. 29, 2026

(54) CONNECTING ELEMENT AND DEVICE ARRANGEMENT

(71) Applicant: ROSENBERGER HOCHFREQUENZTECHNIK GMBH & CO. KG, Fridolfing (DE)

(72) Inventors: Tobias Stadler, Fridolfing (DE); Bernhard Aicher, Fridolfing (DE)

(73) Assignee: ROSENBERGER HOCHFREQUENZTECHNIK GMBH & CO. KG, Fridolfing (DE)

(*) Notice: Subject to any disclaimer, the term of this patent is extended or adjusted under 35 U.S.C. 154(b) by 327 days.

(21) Appl. No.: 18/426,652

(22) Filed: Jan. 30, 2024

(65) Prior Publication Data

US 2024/0258726 A1 Aug. 1, 2024

(30) Foreign Application Priority Data

Feb. 1, 2023 (EP) .................................... 23154536

(51) Int. Cl.
*H01R 12/71* (2011.01)
*H01R 12/70* (2011.01)
(Continued)

(52) U.S. Cl.
CPC ......... *H01R 12/71* (2013.01); *H01R 12/7082* (2013.01); *H01R 13/02* (2013.01); *H01R 13/6581* (2013.01)

(58) Field of Classification Search
CPC .. H01R 13/035; H01R 13/02; H01R 13/6581; H01R 12/71; H01R 12/7082
(Continued)

(56) References Cited

U.S. PATENT DOCUMENTS 5,624,268 A * 4/1997 Maeda ................ H10W 70/635 439/91
5,759,047 A * 6/1998 Brodsky ............ H01R 13/2414 439/67

(Continued)

FOREIGN PATENT DOCUMENTS

| | | | |
|---|---|---|---|
| DE | 102005033915 | A1 | 2/2007 |
| EP | 3627635 | A1 | 3/2020 |
| WO | 2009143252 | A1 | 11/2009 |

OTHER PUBLICATIONS

Extended European Search Report issued in App. No. EP23154536, dated Jul. 12, 2023, 8 pages.

*Primary Examiner* — Gary F Paumen
(74) *Attorney, Agent, or Firm* — Koffsky Schwalb LLC

(57) ABSTRACT

Connecting element for the electrical connection of a first electrical device to a second electrical device, having a carrier body with a first contact side and an opposite second contact side. The connecting element also has a multiplicity of separate electrical contact elements, which respectively have a first contact region for the electrical contacting of the first electrical device and a second contact region for the electrical contacting of the second electrical device, the first contact region and the second contact region being electrically connected to one another and the contact elements respectively being connected to the separate carrier body, such that the first contact region can be electrically contacted from the first contact side and the second contact region can be electrically contacted from the second contact side. The contact elements are respectively configured resiliently at least in sections along a contacting direction (K) running from the first contact region to the second contact region, to compensate for a tolerance-related distance offset between the two electrical devices.

16 Claims, 5 Drawing Sheets

(51) Int. Cl.
*H01R 13/02* (2006.01)
*H01R 13/6581* (2011.01)

(58) Field of Classification Search
USPC .................................................... 439/66, 55
See application file for complete search history.

(56) References Cited

U.S. PATENT DOCUMENTS

| | | | | |
|---|---|---|---|---|
| 6,799,977 | B2 * | 10/2004 | Liu .................... | H01R 13/2414 439/91 |
| 6,814,584 | B2 * | 11/2004 | Zaderej .............. | H01R 13/2414 439/67 |
| 7,021,941 | B1 * | 4/2006 | Chuang .............. | H01R 13/2414 439/66 |
| 7,473,102 | B2 * | 1/2009 | Colgan .................. | H05K 1/141 257/E23.068 |
| 8,523,615 | B2 * | 9/2013 | Luo .................... | H01R 13/2435 439/660 |
| 11,251,551 | B2 | 2/2022 | Gruber | |
| 2002/0022383 | A1 | 2/2002 | Sakata | |
| 2005/0042895 | A1 * | 2/2005 | Liu .................... | H01R 13/2414 439/66 |
| 2006/0084288 | A1 * | 4/2006 | Chuang .............. | H01R 13/2414 439/66 |
| 2006/0128176 | A1 * | 6/2006 | Johnson ............... | H05K 3/4015 439/66 |
| 2007/0298626 | A1 * | 12/2007 | Hougham .......... | G01R 1/06738 439/329 |
| 2009/0053908 | A1 * | 2/2009 | Hougham .............. | H01R 12/00 439/66 |
| 2010/0159718 | A1 | 6/2010 | Duquerroy | |
| 2012/0149248 | A1 | 6/2012 | Luo | |

* cited by examiner

CONNECTING ELEMENT AND DEVICE ARRANGEMENT

The invention relates to a connecting element for the electrical connection of a first electrical device to a second electrical device, having a carrier body with a first contact side and an opposite second contact side and a multiplicity of separate electrical contact elements, according to the disclosure.

The invention also relates to a device arrangement having a first electrical device, a second electrical device and a connecting element for the electrical connection of the two devices.

Various possibilities are known for the electrical connection of electrical devices, for example electrical printed circuit boards (PCBs), inter alia unshielded plug connectors, wire strands and ribbon cables. Such connections are also known by the term "board-to-board" connectors. A majority of the conventional connections are insufficient in particular for radiofrequency technology.

In order to transmit signals with a high data rate between two printed circuit boards, coaxial connecting elements are therefore often used in order to ensure a sufficient signal quality. A coaxial connecting element is in this case generally connected to respective coaxial plug connectors fitted on a printed circuit board. The plug connectors on the printed circuit board are preferably soldered or pressed onto the printed circuit board and electrically connected to traces of the printed circuit board. The connecting element which may be positioned between the two plug connectors is used as a coaxial interface and therefore bridges the distance between the two printed circuit boards in order to allow the signal exchange. Such a three-piece structure is disclosed, for example, by EP 3 627 635 A1.

Alternatively, two-piece coaxial printed circuit board connections are also known. In this case, each of the printed circuit boards generally has a coaxial printed circuit board plug connector, these being insertable directly into one another. A coaxial interface may therefore be obviated.

In the known printed circuit board connections, a multiplicity of individual parts respectively need to be manufactured and assembled, which leads to a high production outlay—and not least to high production costs. Particularly when the printed circuit board connections are intended to be used for radiofrequency technology, the requirements of the manufacturing tolerances are particularly high. This is problematic in particular when a plurality of individual component parts need to interact with an accurate fit. Furthermore, the multipiece nature of the printed circuit board connections substantially increases the total height of the overall arrangement.

A structure for the connection of two printed circuit boards, which is simplified in comparison with the multipiece printed circuit board connections, is presented in DE 10 2005 033 915 A1. A one-piece resilient block is proposed, which has an inner conductor section and two outer conductor sections. The resilient block may be arranged directly between the two electrical printed circuit boards. Because of the resilience, the connector is also partially suitable to compensate for an obliquity or a distance offset between the printed circuit boards. It has been found, however, that the possibilities for tolerance compensation are actually very limited in practice. Furthermore, the electrical properties and mechanical connectability of the block to the printed circuit boards are disadvantageous, for which reason the connector is only limitedly suitable for use in radiofrequency technology and is not suitable for long-term robust connection.

In view of the known prior art, the object of the present invention is to provide a connecting element for the electrical connection of two electrical devices, which can be produced and assembled with little outlay, preferably with a low total height and good suitability for tolerance compensation, in particular while maintaining electrical transmission properties suitable for radiofrequency technology.

Lastly, it is also an object of the invention to provide a device arrangement which can be produced and assembled with little outlay, preferably with a low total height and good suitability for tolerance compensation, in particular while preserving electrical transmission properties suitable for radiofrequency technology.

The object is achieved for the connecting element by the features mentioned in the disclosure. In respect of the device arrangement, the object is achieved by the features of the disclosure.

The features described below relate to advantageous embodiments and variants of the invention.

A connecting element for the electrical connection of a first electrical device to a second electrical device is provided.

The connecting element is preferably configured for direct electrical connection of the electrical devices, that is to say preferably without further electrical components arranged between the devices and the connecting element.

Optionally, the connecting element may also be configured for mechanical connection to at least one of the electrical devices, that is to say for example in order to fasten at least one of the two devices mechanically on the connecting element. In this way, the connecting element may if appropriate also be used to mechanically connect the two devices to one another. This is not however necessary categorically, or for all applications. In particular, the two devices may if appropriate also be mechanically connected to one another and/or to an adjacent component in another way, for example in order to assume a defined position/alignment/orientation relative to one another.

In order to connect the two electrical devices, the connecting element is preferably positioned between the two devices. Optionally, a fastening element (of the device(s), of the connecting element, and/or a separate fastening element) or other fastening measures may be provided.

The first electrical device and the second electrical device, which will sometimes also be described below as "the (electrical) devices" or "the two (electrical) devices" for brevity, are preferably not part of the connecting element.

Preferably, the connecting element is configured for the electrical connection (and optionally also for the mechanical connection) of two electrical printed circuit boards. In principle, the connecting element may, however, be suitable for the electrical (and optionally mechanical) connection of any desired electrical or electronic devices, for example for the connection of control units, filters, antennas and/or other modules. For simplification, the invention will essentially be described below in the context of a connection of two electrical printed circuit boards. The term "printed circuit board" may, however, readily be related by a person skilled in the art to any desired electrical or electronic device and correspondingly substituted.

According to the invention, the connecting element has a carrier body with a first contact side and an opposite second contact side.

The connecting element is preferably arranged between the two electrical devices in such a way that the first contact side faces toward the first electrical device and the second contact side faces toward the second electrical device.

According to the invention, the connecting element has a multiplicity of separate electrical contact elements.

The term "separate" electrical contact elements is to be understood as meaning that the contact elements are respectively configured as mutually independent component parts, or components, of the connecting element. Furthermore, the contact elements are also configured separately from the carrier body. In the scope of the invention, the contact elements are therefore not configured monolithically, or in one piece, either with one another or with the carrier body.

Preferably, all the contact elements of the connecting element are respectively configured identically (particularly in relation to geometry and structure/material). Nevertheless, different types of contact elements may be combined in the connecting element. However, the use of only one single contact element type is preferred since using the same parts can further reduce the production outlay.

According to the invention, each contact element has a first contact region for the electrical contacting of the first electrical device and a second contact region for the electrical contacting of the second electrical device, the first contact region and the second contact region being electrically connected to one another (preferably directly). The contact elements are respectively connected to the carrier body in such a way that the first contact region can be electrically contacted from the first contact side and the second contact region can be electrically contacted from the second contact side.

The contact elements are therefore preferably each accessible from the first contact side and from the second contact side. In this way, for example, electrical contacts of the first electrical device (referred to below as "first electrical contacts") may contact the corresponding contact elements on the first contact side on the first contact region and electrical contacts of the second electrical device (referred to below as "second electrical contacts") may contact the corresponding contact elements on the second contact side on the second contact region.

Preferably, the contact elements respectively form electrical paths, in particular respectively separate electrical paths (electrically insulated from one another). The contact elements may however also be electrically connected to one another, for example directly by mutual contact or indirectly via separate contact bridges or electrical components of the connecting element or by means of interconnection on the electrical devices. A plurality of contact elements may, for example, be combined to form a functional group (for example, a plurality of contact elements may form outer conductor contact elements electrically connected to one another, as also mentioned below).

The electrical connection between the first contact region and the second contact region is preferably a galvanic electrical connection.

The contact elements are preferably at least substantially elongate bodies. The contacting with the electrical contacts of the electrical devices may in particular be carried out via the respective ends or end sections of the contact elements, for example via the frontal ends or via lateral faces in the region of the ends/end sections.

According to the invention, the contact elements are respectively configured resiliently at least in sections (preferably fully) along a contacting direction running from the first contact region to the second contact region, in order to compensate for a tolerance-related distance offset between the two electrical devices.

The "contacting direction" preferably runs between the two contact sides of the connecting element, or between the two electrical devices connected to one another. Preferably, the contacting direction is oriented at least substantially orthogonally with respect to the contact sides.

Preferably, the contacting direction extends along a respective longitudinal axis of the corresponding contact element.

Preferably, the contact elements are configured resiliently at least in sections (preferably fully) in all spatial directions. The contact elements may thus, in particular, be fully configured resiliently.

The deformability, or the resilience, of the contact elements may be so pronounced that the contact elements can reversibly deform sufficiently between the devices for the compensation of tolerance-related distance offset or to compensate for a tilt angle between the devices, without experiencing an (irreversible) plastic deformation.

In the manner proposed, a board-to-board connection may be producible as a single module with an extremely small total height. Respective plug connectors and mating plug connectors, in particular plug connectors on the printed circuit board, may be obviated. It has been shown that even total sizes of less than 10 mm, in particular less than 8 mm, for example even less than 5 mm may readily be produced.

The connecting element may, in particular, be advantageously suitable for the transmission of electrical signals in radiofrequency technology. In principle, however, the connecting element may be suitable for any desired signal and/or energy transmissions throughout electrical engineering.

The device connection which can be produced with the connecting element can be made and assembled between the electrical devices with technically simple means.

By the connecting element according to the invention, even a large offset in the distance between the two electrical devices, and in particular even a large tilt angle between the two electrical devices, may advantageously be compensated for. The Inventors have discovered that a particularly advantageous tolerance compensation may be achieved when respectively using separate electrical contact elements that are each resiliently compressible individually—in contrast to a single resilient block which is divided into individual contact sections. In the manner proposed in the present case, tolerances in the offset and angle may be compensated for substantially "pointwise", or in sections. The compensating task is mechanically divided between the individual contact elements—the contact elements are preferably each mechanically decoupled from one another.

In one advantageous development of the invention, the carrier body may be formed from an electrically insulating material. In principle, the carrier body may be formed from any desired resiliently insulating material. Preferably, however, the carrier body is formed from a plastic, in particular from a hard plastic, for example from the group of thermoplastics and thermosets.

In exceptional cases, the carrier body may also be formed from an electrically conductive material, or the carrier body may comprise an electrically conductive material. In this case, at least one of the electrical contact elements is preferably arranged in the carrier body while being electrically insulated from one or more of the other electrical contact elements, for example by an electrically insulating coating in the recesses which will be mentioned below. A structure of the carrier body consisting of a plurality of different materials may optionally also be provided, some of which are configured to be electrically conductive and others in turn to be electrically insulating. Preferably, however, the carrier body is formed only from an electrically insulating material, as mentioned above.

The carrier body may be configured in one piece or multiple pieces. For example, the carrier body may have two carrier parts which can be connected to one another. The carrier parts may for example be engageable, screwable or pressable to one another or connectable to one another in another way with a form fit, force fit and/or materially.

According to one development of the invention, the carrier body may be a rigid component (in particular compared with the resilience of the contact elements).

Preferably, a tolerance compensation in the spacing and/or tilt angle between the two devices therefore takes place only by the contact elements and not by the carrier body.

In particular, the carrier body is used for defined arrangement, alignment and fastening of the contact elements relative to one another. The carrier body is preferably configured to carry the contact elements at least securely against loss. Optionally, the carrier body may also be only a temporary component of the connecting element, which is removed again after the two devices have been connected, only the contact elements remaining behind—if appropriate, the carrier body is therefore also just used as an assembly aid for joint and therefore convenient and error-free assembly of the contact elements between the devices. Preferably, however, the carrier body is a permanent component of the connecting element.

According to one development of the invention, the carrier body may be a predominantly flat component, the frontal sides of the flat carrier body preferably forming the contact sides.

The carrier body may preferably be configured in the form of a disk or in the form of a plate. A flat disk-shaped configuration of the carrier body is particularly advantageous for achieving small total heights of the connecting element. In special cases, the carrier body may also be a film element.

In particular, a cylindrical, round, rectangular or other polygonal cross section of the carrier body may be provided.

In one development of the invention, the carrier body may have mechanical encoding means in order to allow connection to the electrical devices exclusively in one or more predefined orientations.

The mechanical encoding means may preferably be one or more projections and/or indentations on the contact sides. Preferably, at least one of the contact sides is equipped with encoding means in order to compel a predefined orientation for the connection at least with one of the devices.

Preferably, pin-shaped projections may be provided, which can be inserted into corresponding indentations of the respective device, in particular two pin-shaped projections which optionally are arranged offset, off-center with respect to a midpoint of the carrier body and/or are spaced apart differently from a straight line running through the midpoint of the carrier body.

Mechanical encoding may if appropriate also be provided by the contact elements themselves and/or by the outer shape of the carrier body. If the contact elements themselves provide mechanical encoding, self-alignment may for example be envisioned in the scope of a soldering process (for example by the surface tensions occurring in the scope of a reflow process). A defined outer geometry of the contact element, in particular of the respective contact region, may also be envisioned in combination with a corresponding mating geometry (for example a depression on the corresponding contact side of the electrical device).

In one development of the invention, the carrier body has recesses which extend from the first contact side to the second contact side through the carrier body.

The contact elements may be fastenable, or fastened, in the recesses. Preferably, each of the contact elements is fastened in its own recess—nevertheless, a plurality of contact elements may also be fastened together in one recess (preferably, but not necessarily, spaced apart from one another or electrically insulated from one another by a dielectric dividing element).

The recesses are preferably configured in the manner of a through-bore, although they may have any desired cross section, for example a round cross section, a rectangular cross section or another polygonal cross section. By a rectangular or other polygonal cross section, a defined orientation of the contact elements in the recesses and rotation prevention for the contact elements may preferably also be established.

The recesses may respectively have different cross-sectional geometries in order to receive different contact elements. Preferably, however, all the recesses are configured identically in order to simplify the production of the carrier body.

In one advantageous development of the invention, the contact elements may be fastened with a force fit in the recesses. Preferably, the contact elements are pressed into the recesses; for example, a press fit may be provided.

Force-fit fastening in the recesses may particularly advantageously be carried out when the contact elements are configured resiliently, or compressibly, transversely with respect to the contacting direction at least in a central section received in the recess.

Optionally, fluting or other suitable structuring may be formed inside the respective recess and/or on the outer lateral side on the contact elements, in order to provide an increased frictional interaction between the contact elements and the carrier body.

In particular, a combination of force-fit and form-fit fixing inside a respective recess may also be provided. For example, the contact elements may be shaped concavely along their longitudinal extent and/or the recesses may be shaped convexly on the inside—or vice versa. A concave shape of the contact element may if appropriate not be adjusted inside the recess until it is adjusted by the resilient compression of the contact element inside the recess, although it may preferably also already exist in the mechanically relaxed basic state of the contact element.

In one development of the invention, the contact elements may be fastened with a form fit in the recesses.

In particular, the contact elements may be engaged in the recesses. The contact elements may for this purpose have engagement elements and the connecting element, in particular a respective recess, may have mating engagement elements (inter alia respectively: engagement grooves, engagement ribs, engagement bars, engagement pins, engagement rockers, detent springs and/or other engagement indentations/engagement projections). Preferably, the engagement elements and/or mating engagement elements run at least partially annularly or fully annularly in the circumferential direction. A stepped bore or recess may also be provided in order to provide an edge that acts as mating engagement elements at the transition of the different cross sections.

At this point, it should be mentioned that form-fit engagement of the contact element with the carrier body, or the connecting element, may also take place outside a respective recess, for example by the shaping of the contact element per se, that is to say for example when the contact element is tapered in the section which is intended to be fastened in the recess, or when the connecting element or the carrier body has separate mating engagement elements in the region of the recess on the respective contact side.

In one variant of the form-fit engagement, the contact elements may be received at least in sections between two carrier parts of a multipiece carrier body already mentioned above. The security against loss or form-fit arrangement of the contact elements may thus, for example, not be provided until the two carrier parts are assembled.

The contact elements may have openings which are arranged transversely with respect to the contacting direction (in particular fully continuous openings in the manner of through-bores). Any desired number of openings may be provided per contact element, although precisely one or precisely two openings are preferably provided per contact element. By the openings, the resilience may advantageously be established and material may also be saved. The openings may also advantageously be able to be used to fasten the contact element on the connecting element with a form fit, force fit and/or materially, in particular by the optional elongate fastening elements of the carrier body which are mentioned below.

In one advantageous development of the invention, the carrier body may have elongate fastening elements which are received with a force fit and/or form fit in corresponding openings in the contact elements in order to fasten the contact elements on the carrier body.

Preferably, each of the contact elements is fastened on its own fastening element. A plurality of contact elements may, however, also be arranged on a common fastening element (preferably, but not necessarily, spaced apart from one another or electrically insulated from one another by a dielectric dividing element). The elongate fastening elements may, in particular, be configured as fastening pins.

The elongate fastening elements may if appropriate (but not necessarily) extend fully through the respective contact element and optionally re-emerge from the contact element on the side of the contact element lying opposite the entry side.

In one advantageous development of the invention, the elongate fastening elements may extend transversely (preferably orthogonally) with respect to the contacting direction.

The elongate fastening elements may in principle extend at any desired angle relative to the contacting direction, that is to say for example including along the contacting direction. Preferably, however, the elongate fastening elements extend at an angle (in particular orthogonally) with respect to the contacting direction.

In particular, the elongate fastening elements may extend laterally away from the connecting element, for example starting from an outer lateral surface of the carrier body running between the two contact sides. If appropriate (less preferentially), the elongate fastening elements may however also be arranged on one of the contact sides or on both contact sides.

In one particularly preferred configuration, the elongate fastening elements may be arranged inside a respective recess. In this way, the contact elements may be arranged in the recesses and at the same time fastened on the elongate fastening elements, so that a particularly compact and robust connecting element may be provided.

In one advantageous development of the invention, the contact elements may respectively be arranged elevated, or protruding, on the contact sides of the carrier body.

The contact elements thus preferably protrude in each case out of the recess with their respective ends, or end sections, on the two contact sides, although if appropriate they may also be arranged coplanar or set back on one contact side or on both contact sides (for example when the electrical contacts of the devices are pin contacts, or similar elongate contacts which can penetrate into the recesses).

In one development of the invention, the contact elements may have a base body formed from an elastomer, around which an electrically conductive sheath is arranged at least in sections.

The contact elements configured in this way may preferably be produced inexpensively from meterware in the scope of mass production.

The sheath is preferably configured and arranged on the elastomer in such a way that it can provide the first contact region and the second contact region (preferably a respective electrical contact face) for the connection to the electrical devices, and preferably has a continuous profile between the two contact regions, or contact faces.

The sheath may enclose the elastomer at least in the form of a sleeve. The sheath may optionally also enclose the elastomer on each side face.

The electrically conductive sheath is preferably configured as a metal foil. If appropriate, however, a metal sheet, a metallic coating or another conductive sheath may also be provided.

The use of an electrically conductive sheath (in particular a metallic sheath, such as a metal foil) around an elastomer may also be particularly advantageous since the possibilities for the connection to the contacts of the devices can be increased. In particular, the metallic sheath (in particular metal foil) may be solderable to the contacts of the device, in contrast to an elastomer block which would merely be processed, for example conductively doped, in regions in order to increase the electrical conductivity. In particular, the electrical properties (for example conductivity) of a metallic sheath may also be increased significantly in comparison with an electrically conductive elastomer.

An adhesive layer, for example a bonder layer, may optionally be arranged between the elastomer and the sheath. In principle, however, the sheath may be connected to the elastomer in any desired way, and if appropriate may also be loose in sections.

According to one development of the invention, at least one of the contact elements may be configured as an inner conductor contact element and the remaining contact elements may be configured as outer conductor contact elements, which are arranged for electromagnetic shielding around the at least one inner conductor contact element.

By the use of a group of contact elements as outer conductor contact elements, which together enclose one or more inner conductor contact elements, a high electromagnetic compatibility of the connecting element may be provided.

The outer conductor contact elements are preferably arranged in equidistant angle sections with respect to one another in order to provide a shielding effect that is as optimal as possible. The distances between the outer conductor contact elements may be minimized in such a way that sufficient shielding is produced.

The outer conductor contact elements may preferably be arranged in such a way that their metallic sheath, if a metallic sheath is used, is arranged with its side faces so that at least one of the side faces is aligned in the direction of the central inner conductor contact element, in order to ensure the shielding outward.

Preferably, the contact elements form a coaxial arrangement consisting of at least one central inner conductor contact element and a plurality of outer conductor contact elements arranged partially annularly or annularly around the inner conductor contact element. A concentric structure is suitable, in particular, for use in radiofrequency technology.

In one configuration of the invention, at least one inner conductor pair consisting of two inner conductor contact elements may also be provided for differential signal transmission.

When using a plurality of inner conductor contact elements, the respective inner conductor contact elements may respectively be electrically insulated individually from one another (for example by a corresponding spacing inside the carrier body). The connecting element may in principle have any desired number of inner conductor contact elements.

The proposed connecting element may, for example, also be suitable as a multiple connector or interposer between two electrical devices, in order to provide a multiplicity of electrical paths between the devices, which may be advantageous for example for a use in order to test electrical devices (for example in order to test printed circuit boards or microchips). Then, for example, the first electrical device may be configured as a microchip and the second electrical device may be configured as an electrical printed circuit board of a test system for testing microchips, in which case the connecting element may be used to establish the electrical connection between the terminals of the chip package and the printed circuit board of the test system.

The connecting element may, in particular, be suitable for the transmission of electrical signals at up to 8 GHz or more. In principle, however, the connecting element may also be used for the transmission of low-frequency signals or for the transmission of electrical supply signals (DC or AC).

In principle, the possible uses of the proposed connecting element are extremely versatile. The invention is not to be understood as being restricted to a particular use of the connecting element.

The invention also relates to a device arrangement having a connecting element according to the comments above and below, the first electrical device and the second electrical device.

The first electrical device is preferably a first electrical printed circuit board, and the second electrical device is preferably a second electrical printed circuit board.

The electrical devices, in particular printed circuit boards, are preferably arranged running parallel to one another in different planes, a space preferably being provided between the two electrical devices. Preferably, the surfaces that can be equipped with electrical components of the printed circuit boards run parallel to one another. In particular, a tolerance-related deviation from the parallel arrangement, for example of up to 10°, preferably of up to 5° and particularly preferentially of up to 4°, is to be understood in the present case as being included by the term "parallel".

Preferably, the first electrical device has first electrical contacts which contact the contact elements of the connecting element (in particular the first contact regions) on the first contact side of the carrier body. Preferably, the second electrical device has second electrical contacts which contact the contact elements of the connecting element (in particular the second contact regions) on the second contact side of the carrier body.

According to the invention, a device arrangement having only a small total height may be provided by using a narrow board-to-board connector, or connecting element.

Despite the small total height and the advantageous electrical properties, the invention is highly suitable for an offset compensation relating to the distance between the electrical devices and/or a relative obliquity of the electrical devices, in that the individual contact elements separated from one another are correspondingly compressed.

In addition, a radial offset between the electrical devices may also be able to be compensated for, for example by correspondingly large contact faces of the contact elements and/or contact faces of the electrical contacts of the devices.

At this point, it should be mentioned that the device arrangement may also have a plurality of aforementioned connecting elements for connection of the first electrical device to the second electrical device.

The device arrangement may also have any desired number of electrical devices, but at least has the aforementioned two electrical devices. Even though for illustration the invention is described essentially for connection of the first electrical device and the second electrical device, the device arrangement may also comprise for example three electrical devices, or printed circuit boards, four electrical devices, or printed circuit boards, five electrical devices, or printed circuit boards, or even more electrical devices, or printed circuit boards.

In one advantageous development of the invention, at least one of the electrical devices may be fastened by means of its electrical contacts on the contact elements of the connecting element (in particular on the contact regions).

The electrical contacts of the devices may preferably be traces, solder pads, vias or contact pins.

Preferably, the at least one electrical device is materially fastened, for example soldered, with its electrical contacts on the corresponding contact elements of the connecting element (in particular on the contact regions). The electrical contacts of the electrical device may also be pressed together with the contact elements of the connecting element (in particular with the contact regions), for example crimped or connected by another connecting technique. Clamping or screwing may also be provided.

Preferably, at least one one-sided solder connection (or other mechanical connection) is thus provided between the connecting element, or its contact elements, and one of the electrical devices, or printed circuit boards. A two-sided solder connection (or other mechanical connection) or purely electrical contacting, or signal transmission, without mechanical fastening of the contact elements on the electrical contacts of the respective device may also be provided.

In the scope of the invention, a plug connection between the connecting element and at least one of the electrical printed circuit boards may even be provided (not preferred).

Features which have been described in connection with one of the subjects of the invention, namely established by the connecting element according to the invention and the device arrangement according to the invention, may also advantageously be used for the other subjects of the invention. Likewise, advantages which have been mentioned in connection with one of the subjects of the invention may also be understood as relating to the other subjects of the invention.

It should additionally be pointed out that terms such as "comprising", "having" or "with" do not exclude other features or steps. Furthermore, terms such as "one" or "the", which indicate a singular of steps or features, do not exclude a multiplicity of features or steps—and vice versa.

In one puristic embodiment of the invention, however, the features introduced in the invention with the terms "comprising", "having" or "with" may be listed definitively.

Accordingly, one or more lists of features in the scope of the invention may be regarded as definitive.

It should be mentioned that designations such as "first" or "second", etc. are used primarily for reasons of the discriminability of respective apparatus or method features, and are not necessarily intended to indicate that features are contingent on one another or are related to one another.

It should furthermore be emphasized that the values and parameters described here also include deviations or variations of ±10% or less, preferably ±5% or less, more preferentially ±1% or less, and more particularly preferentially ±0.1% or less of the respectively mentioned value, or parameter, so long as these deviations are not incompatible with the implementation of the invention in practice. The indication of ranges by initial and final values also covers all those values and fractions which are included by the range mentioned in each case, in particular the initial and final values and a respective average value.

Exemplary embodiments of the invention will be described in more detail below with the aid of the drawings.

The figures respectively show preferred exemplary embodiments in which individual features of the present invention are represented in combination with one another. Features of one exemplary embodiment may also be implemented independently of the other features of the same exemplary embodiment and may correspondingly be readily associated by a person skilled in the art to form further expedient combinations and subcombinations with features of other exemplary embodiments.

In the figures, functionally equivalent elements are provided with the same reference signs.

SCHEMATICALLY

Figure 11:
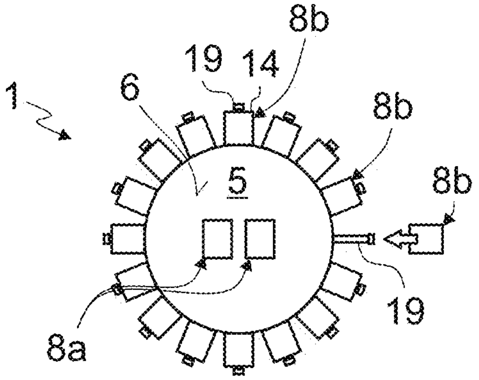
Figure 12:
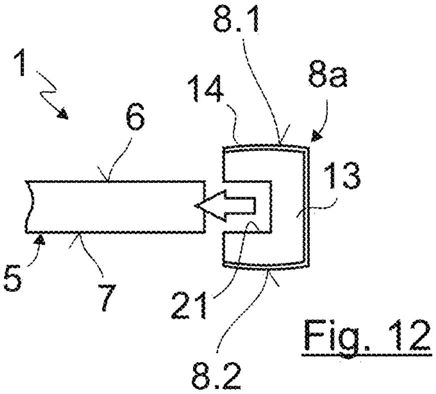

FIG. 11 shows the connecting element according to a fifth exemplary embodiment of the invention, according to which the contact elements are fastened laterally on fastening pins in a common carrier body, in a plan view; and FIG. 12 shows a detail of a connecting element according to a sixth exemplary embodiment of the invention, according to which the contact elements can be fitted laterally onto a common carrier body.

Figure 1:
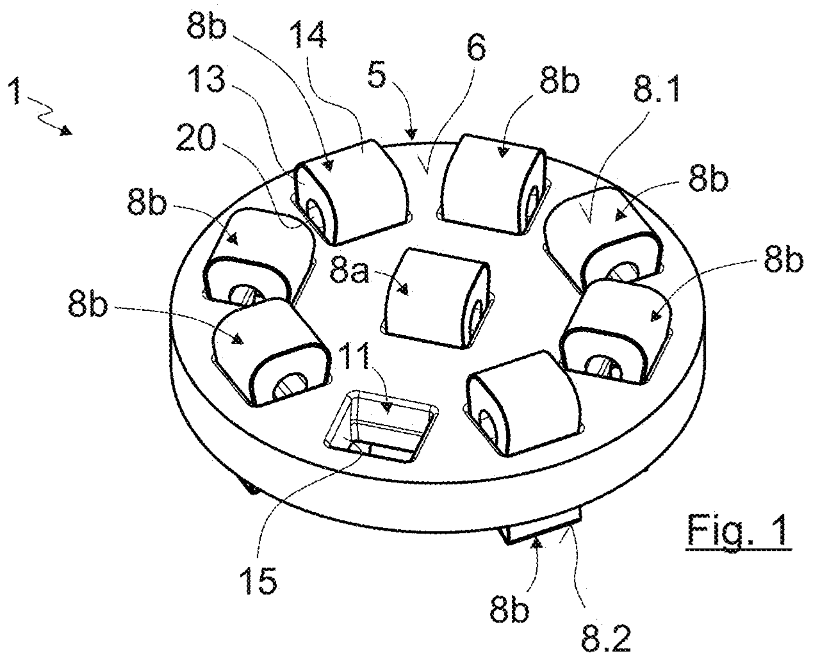
FIG. 1 shows a connecting element according to a first exemplary embodiment of the invention, having a plurality of outer conductor contact elements and a central inner conductor contact element, the contact elements being fastened with a force fit inside respective recesses in a common carrier body, in a first perspective representation.
Figure 2:
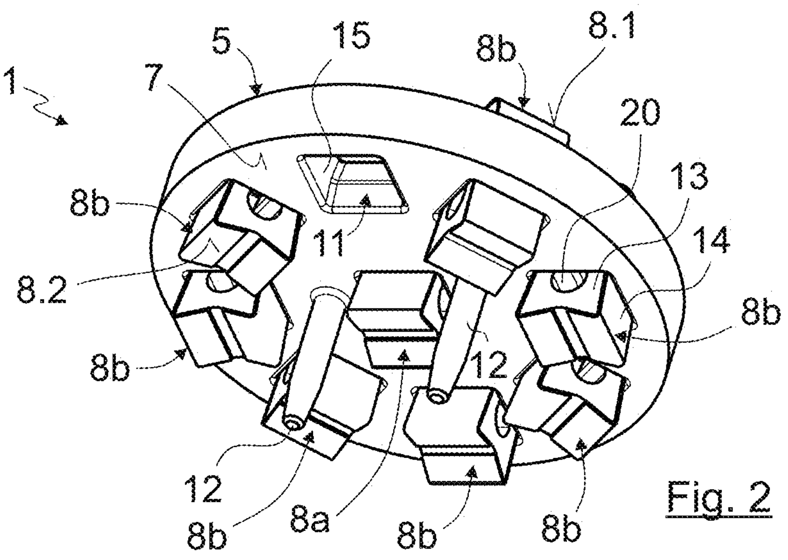
FIG. 2 shows the connecting element of FIG. 1 in a second perspective representation.
Figure 3:
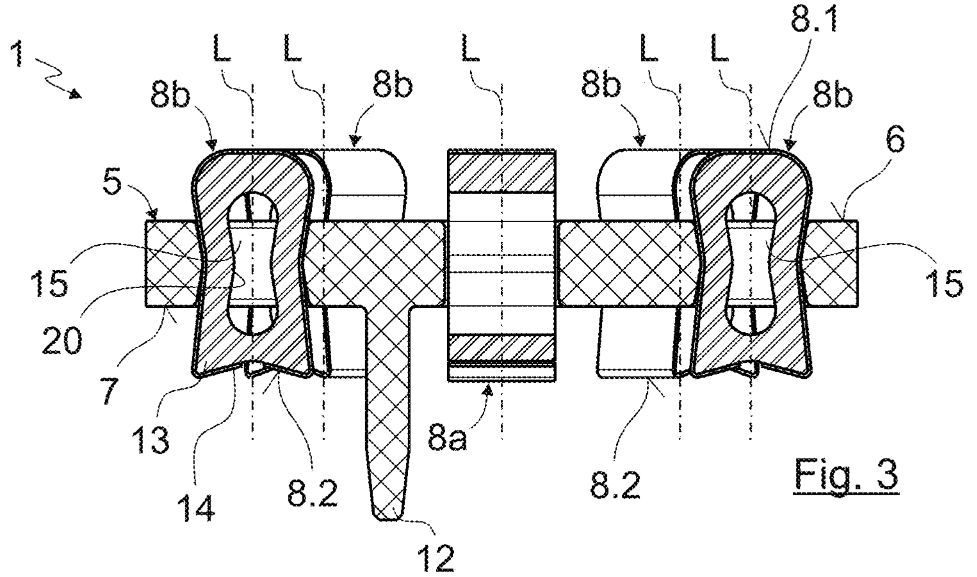
FIG. 3 shows the connecting element of FIG. 1 in a lateral sectional representation.

FIGS. 1 to 3 represent a connecting element 1 according to a first exemplary embodiment of the invention. FIGS. 1 and 2 show respective perspective representations; a lateral sectional representation is shown in FIG. 3. A device arrangement 2 consisting of the connecting element 1 of FIGS. 1 to 3 and a first electrical device 3 as well as a second electrical device 4 is indicated in a side view in FIG. 4.

The connecting element 1 has a carrier body 5 with a first contact side 6 and an opposite second contact side 7. In the exemplary embodiments, the carrier body 5 is formed entirely from an electrically insulating material, preferably from a rigid plastic. The carrier body 5 represented by way of example is a flat component, the frontal sides of which form the contact sides 6, 7 in order to provide a total height that is as small as possible.

The connecting element 1 has a multiplicity of separate electrical contact elements 8*a*, 8*b*, which are respectively connected to the separate carrier body 5 in such a way that they can be electrically contacted respectively from the first contact side 6 and the second contact side 7. Specifically, each contact element 8*a*, 8*b* has a first contact region 8.1 for the electrical contacting of the first electrical device 3 and a second contact region 8.2 for the electrical contacting of the second electrical device 4, the first contact region 8.1 and the second contact region 8.2 being electrically connected to one another. In this way, respective electrical paths between the two contact sides 6, 7 for the electrical connection of the electrical devices 3, 4 can be established along a longitudinal axis L (cf. FIG. 3) of the respective contact element 8*a*, 8*b*.

Figure 4:
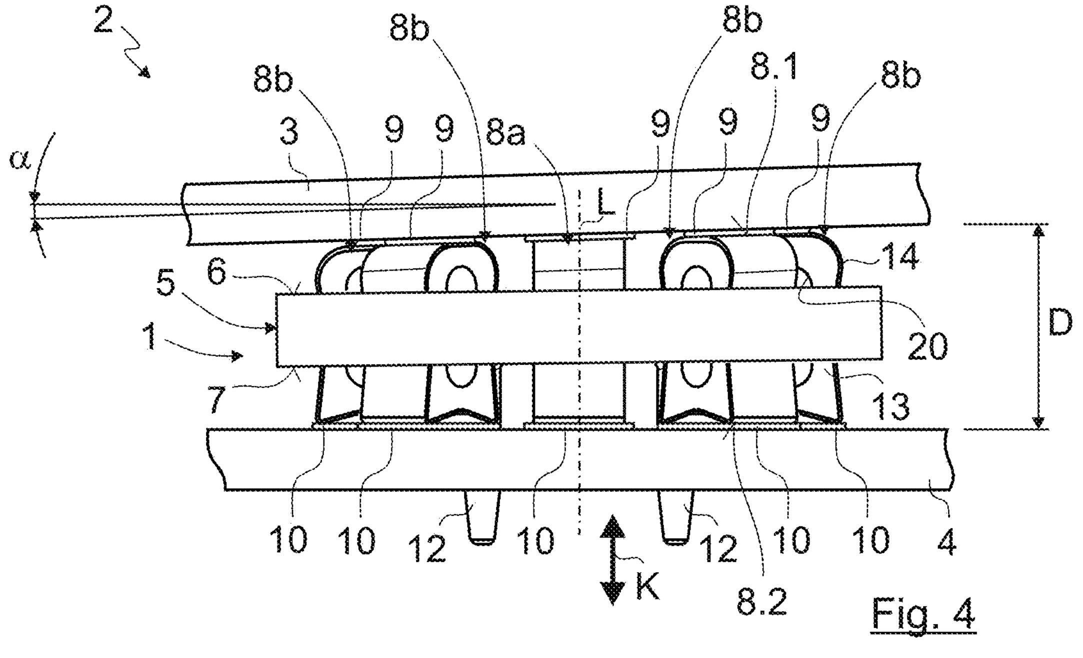
FIG. 4 shows a device arrangement consisting of the connecting element of FIG. 1 and two electrical devices in a side view.

As indicated in FIG. 4, the first electrical device 3 has first electrical contacts 9, which contact the contact elements 8*a*, 8*b* of the connecting element 1 on the first contact side 6 of the carrier body 5. The second electrical device 4 has second electrical contacts 10, which contact the contact elements 8*a*, 8*b* of the connecting element 1 on the opposite second contact side 7 of the carrier body 5. The electrical and mechanical contacting is carried out on the respective contact regions 8.1, 8.2, which in the exemplary embodiments are configured as respective contact faces.

Preferably, at least one of the electrical devices 3, 4 may be mechanically fastened, preferably soldered, by means of its electrical contacts 9, 10 on the contact elements 8*a*, 8*b* of the connecting element 1. The electrical contacts 9, 10 of the electrical devices 3, 4 may for example be traces, solder pads and/or vias. Preferably, the connecting element 1 is intended for the electrical connection of a first electrical printed circuit board 3 to a second electrical printed circuit board 4. In principle, however, any desired electrical devices 3, 4 may be electrically connected to one another with the proposed connecting element 1.

The exemplary embodiments of FIGS. 1 to 10 show by way of example a coaxial arrangement of the contact elements 8*a*, 8*b*, one of the contact elements being configured as an inner conductor contact element 8*a* and the remaining contact elements being configured as outer conductor contact elements 8*b*, which for electromagnetic shielding extend around the at least one inner conductor contact element 8*a* and are preferably arranged in equidistant angle sections with respect to one another in order to electromagnetically shield the inner conductor contact element 8*a* outward. A non-coaxial configuration of the connecting element 1 may however also be provided, for example differential signal transmission by using two inner conductor contact elements 8*a* (cf. FIG. 11). The coaxial arrangement predominantly thematized in the description is therefore merely exemplary and not to be understood as restrictive for the present invention.

At this point, it should be mentioned that the arrangement of the outer conductor contact elements 8*b* runs only partially annularly in the exemplary embodiments of FIGS. 1 to 10. A gap 11 is provided in the annular arrangement, or a position is respectively not occupied by an outer conductor contact element 8*b*. A gap 11 in the outer conductor ring may be advantageous in order not to contact a trace of the respective printed circuit board 3, 4, which carries the central signal contact on the respective printed circuit board 3, 4, with one of the outer conductor contact elements 8*b*. The possibility of guiding a trace through into the center of the outer conductor may therefore be provided. If, however, the signal conductor is configured as an intermediate layer inside the electrical printed circuit board 3, 4 and is routed as a via directly inside the annular outer conductor arrangement, all contact locations may also be provided with an outer conductor contact element 8*b*.

In order to allow connection to the electrical devices 3, 4 exclusively in one or more predefined orientations, the carrier body 5 may optionally have mechanical encoding means 12, which in the exemplary embodiments are respectively configured as pin-shaped projections formed on the second contact side 7. The encoding means 12, or pin-shaped projections, are preferably arranged off-center and/or not on a common straight line running through the midpoint of the carrier body 5.

The contact elements 8*a*, 8*b* are respectively configured resiliently at least in sections along the contacting direction K, in order to compensate for any tolerance-related distance offset between the two electrical devices. In this way, for example, an offset of the distance D between the electrical devices 3, 4 and/or a tilt angle α between the two devices 3, 4 may be compensated for (cf. FIG. 4).

Advantageously, an economical connecting element 1 configured as a single module for the connection of two electrical devices 3, 4, which tolerates a defined offset between the electrical devices 3, 4, may thus be provided.

In the exemplary embodiments, the contact elements 8*a*, 8*b* respectively have a base body formed from an elastomer 13 (cf. in particular the sectional representation of FIG. 3), around which an electrically conductive sheath 14 (for example a metal foil) is arranged at least in sections, in particular in the form of a sleeve. The conductive sheath 14 is configured in order to provide corresponding contact regions or contact faces 8.1, 8.2 for the connection to the electrical devices 3, 4. For sufficient shielding, the conductive sheath 14 is preferably aligned in the direction of the inner conductor contact element 8*a* (cf. in particular FIG. 1). Optionally, the conductive sheath 14 may be materially connected, for example adhesively bonded, to the elastomer 13.

Preferably, the contact elements 8*a*, 8*b* are connected securely against loss to the carrier body 5. For this purpose, various advantageous variants may be provided, some of which will be explained by way of example below.

In the first exemplary embodiment according to FIGS. 1 to 4, the carrier body 5 has recesses 15 which extend from the first contact side 6 to the second contact side 7 through the carrier body 5. The contact elements 8*a*, 8*b* are fastened in the recesses 15 (each of the contact elements 8*a*, 8*b* in its own recess 15). In the exemplary embodiment of FIGS. 1 to 4, the contact elements 8*a*, 8*b* are fastened in the recesses 15 with a force fit, or pressed into the recesses 15. In addition, the recesses 15 have a convex curvature on the inner side and the contact elements 8*a*, 8*b* have a concave external shape. Because the contact elements 8*a*, 8*b* are tapered in their central section, they can be fastened particularly well in the recesses 15. Tapers of the contact elements 8*a*, 8*b* or convex recesses 15 are not, however, categorically necessary in order to fasten the contact elements 8*a*, 8*b* in the recesses 15 with a force fit. Even a pure force fit may already be sufficient to fasten the contact elements 8*a*, 8*b* securely against loss.

As may be seen clearly with the aid of the figures, the contact elements 8*a*, 8*b* are respectively arranged elevated on the contact sides 6, 7 of the carrier body 5. In this way, the tolerance compensation and the contacting may be carried out particularly advantageously and reliably.

Figure 5:
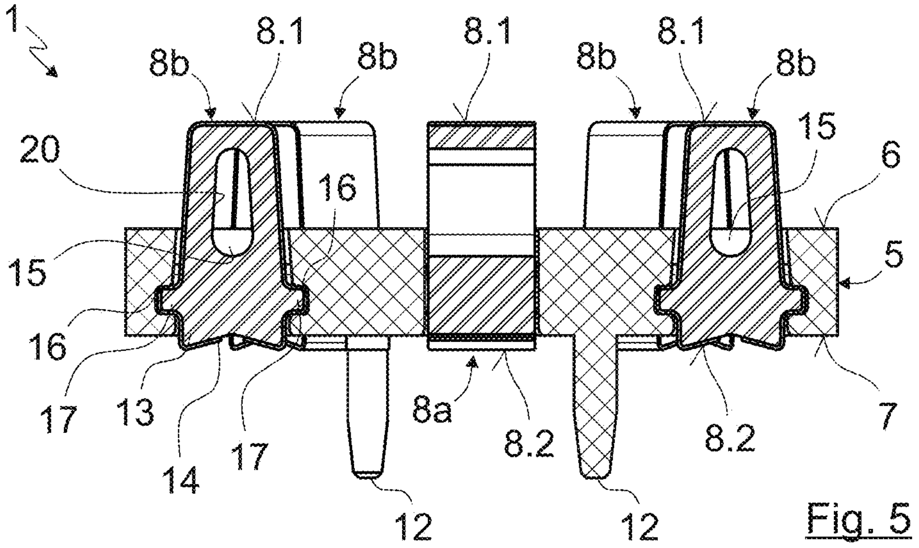
FIG. 5 shows a connecting element according to a second exemplary embodiment of the invention, according to which the contact elements are engaged with a form fit inside respective recesses in a common carrier body, in a lateral sectional representation.

FIG. 5 shows a second exemplary embodiment of a connecting element 1 according to the invention. The carrier body 5 again has respective recesses 15 for the contact elements 8*a*, 8*b*. In the exemplary embodiment represented in FIG. 5, however, the contact elements 8*a*, 8*b* are fastened in the recesses 15 not with a force fit but exclusively with a form fit, and to this end are engaged in the recesses 15. For this purpose, the contact elements 8*a*, 8*b* have respective engagement elements 16 in the form of rib-like elevations on the lateral faces and the recesses 15 have corresponding mating engagement elements 17 in the form of an engagement groove in the inner wall.

Furthermore, it is indicated for example with the aid of FIG. 5 that the contact elements 8*a*, 8*b* need not protrude uniformly, or symmetrically, from both sides of the recesses 15. Even an elevated arrangement of the contact elements 8*a*, 8*b* on the contact sides 6, 7 is not categorically necessary; an arrangement of the contact elements 8*a*, 8*b* which is coplanar or set back inside the recess 15 may also be provided if appropriate on one or both contact sides 6, 7 of the carrier body 5.

Figure 6:
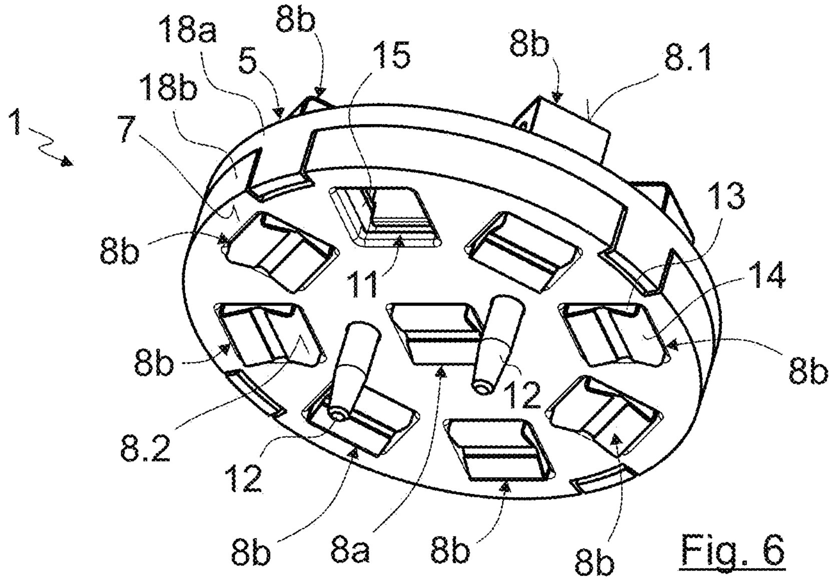
FIG. 6 shows a connecting element according to a third exemplary embodiment of the invention, according to which the contact elements are fastened with a form fit inside respective recesses in a two-piece carrier body, in a perspective representation.
Figure 7:
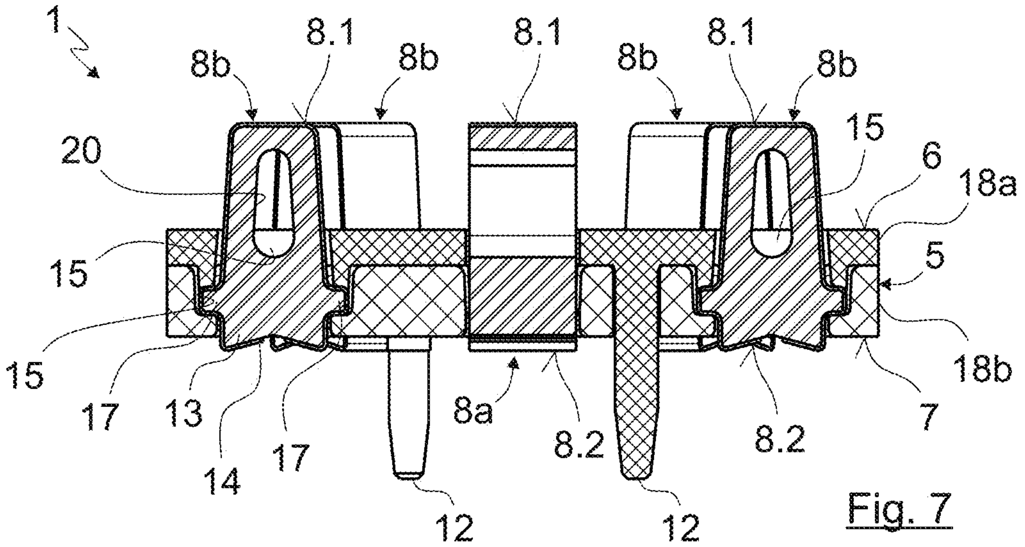
FIG. 7 shows the connecting element of FIG. 6 in a lateral sectional representation.

FIGS. 6 and 7 represent a third exemplary embodiment of a connecting element 1, in which a form fit of the contact elements 8*a*, 8*b* is again provided inside the recesses 15. In the third exemplary embodiment, the carrier body 5 is configured in multiple pieces and has two carrier parts 18*a*, 18*b* which can be engaged with one another. The recesses 15 are configured in the respective carrier parts 18*a*, 18*b* in such a way that, after the carrier parts 18*a*, 18*b* are joined together, this provides a form fit for the contact elements 8*a*, 8*b* (cf. FIG. 7) which holds the contact elements 8*a*, 8*b* securely inside the recesses 15.

Figure 8:
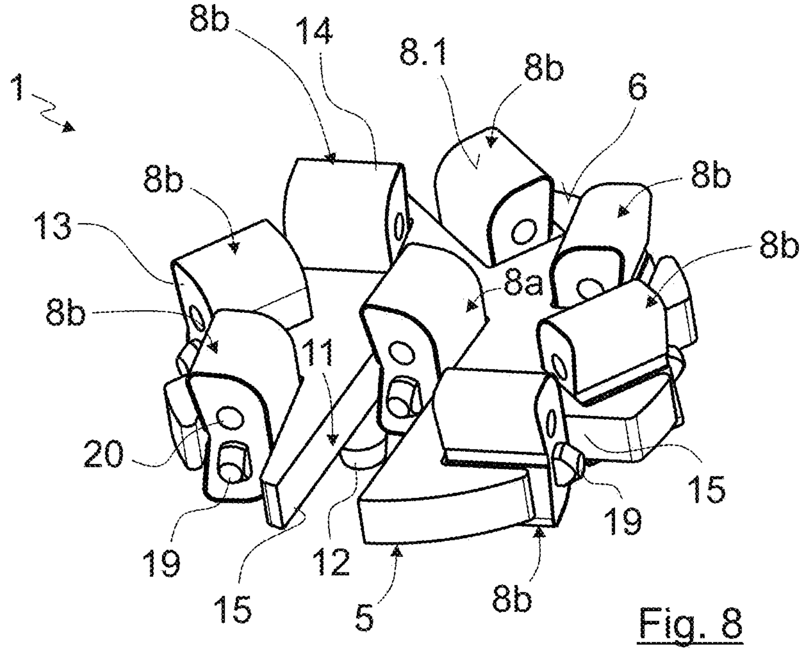
FIG. 8 shows a connecting element according to a fourth exemplary embodiment of the invention, according to which the contact elements are fastened on fastening pins inside respective recesses of a common carrier body, in a first perspective representation.
Figure 9:
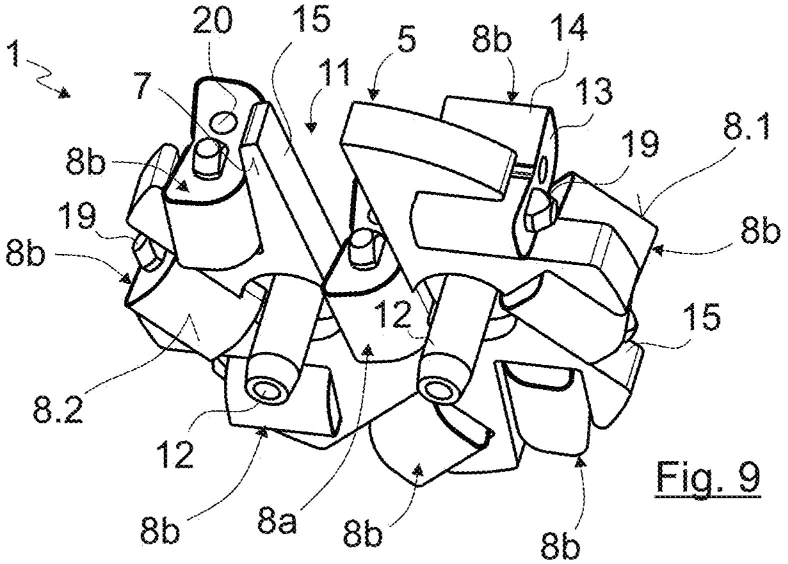
FIG. 9 shows the connecting element of FIG. 8 in a second perspective representation.
Figure 10:
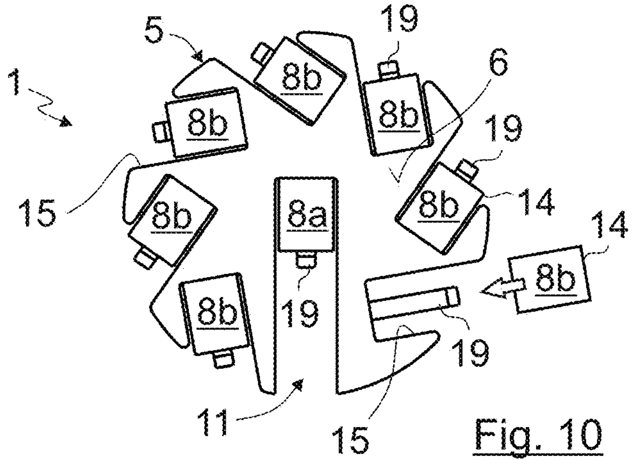
FIG. 10 shows the connecting element of FIG. 8 in a plan view.

FIGS. 8 and 9 show a fourth exemplary embodiment of the invention. In contrast to the previous exemplary embodiments, the recesses 15 in the fourth exemplary embodiment are configured not in the form of windows inside the carrier body 5 but in such a way that they are open toward the lateral sides of the carrier body 5, that is to say in the form of slots. In order to fasten the contact elements 8*a*, 8*b* in the slot-like recesses 15, in the exemplary embodiment of FIGS. 8 and 9 exemplary but not categorically necessary elongate fastening elements or fastening pins 19 are provided, which extend transversely with respect to the contacting direction K and are arranged inside the slot-like recesses 15. The fastening pins 19 may be received with a force fit and/or form fit in corresponding openings 20 in the contact elements 8*a*, 8*b*, in order to fasten the contact elements 8*a*, 8*b* on the carrier body 5. Each of the contact elements 8*a*, 8*b* is arranged on its own fastening pin 19, or in its own recess 15.

At this point, it should be mentioned that the contact elements 8*a*, 8*b* may also have openings 20 when fastening on a fastening pin 19 is not envisioned. The openings 20 may advantageously be provided in order to establish the elasticity and to save weight and material (cf. also FIGS. 1-7). Any desired number of openings 20 per contact element 8*a*, 8*b* may be provided.

At this point, it should also be mentioned that the fastening pins 19 need not necessarily be arranged inside recesses 15 of the carrier body 5. This is to be further illustrated with the aid of the fifth exemplary embodiment, which is indicated in FIG. 11. In principle, the fastening pins 19 may extend directly from the outer lateral side faces of the carrier body 5 transversely (or at another angle) with respect to the contacting direction K.

In addition, with the aid of a detail of a connecting element 1 according to a sixth exemplary embodiment, it is also to be illustrated in FIG. 12 that if appropriate the carrier body 5 itself need not have any specific means for fastening the contact elements 8*a*, 8*b*. For example, the contact elements 8*a*, 8*b* may be fitted laterally onto the carrier body 5, in particular when the contact elements 8*a*, 8*b* have corresponding fastening grooves 21, or fastening slots, which allow form-fit and/or force-fit fastening.

In this context, it should also be mentioned that if appropriate the carrier body 5 may also only provide fastening for the contact elements 8*a*, 8*b* securely against loss temporarily.

We claim:

1. A connecting element for electrically connecting a first electrical device to a second electrical device, the connecting element comprising:

a carrier body having a first contact side and an opposite second contact side; and a plurality of separate electrical contact elements, wherein each contact element of the plurality of contact elements is separate from the carrier body and includes a base body formed from an elastomer and an electrically conductive sheath arranged around the base body at least in sections, wherein the electrically conductive sheath provides a first contact region for electrically contacting the first electrical device and a second contact region for electrically contacting the second electrical device, the first contact region and the second contact region being electrically connected to one another, wherein each contact element of the plurality of contact elements is respectively coupled to the carrier body, such that the first contact region is electrically contactable from the first contact side of the carrier body and the second contact region is electrically contactable from the second contact side of the carrier body, wherein each contact element of the plurality of contact elements is configured resiliently along a contacting direction (K) running from the first contact region to the second contact region, to compensate for a tolerance-related distance offset between the first and second electrical devices, and wherein the electrically conductive sheath is at least one of, a metal foil, a metal sheet, or a combination thereof.

2. The connecting element of claim 1, wherein the carrier body is formed from an electrically insulating material.

3. The connecting element of claim 1, wherein the carrier body is a rigid component.

4. The connecting element of claim 1, wherein the carrier body is a flat component having a first frontal side and a second frontal side, the first frontal side forming the first contact side and the second frontal side forming the second contact side.

5. The connecting element of claim 1, wherein the carrier body further comprises a mechanical encoding means that allows connecting to the first and second electrical devices exclusively in a predefined orientation.

6. The connecting element of claim 1, wherein the carrier body includes a plurality of recesses extending from the first contact side to the second contact side through the carrier body, and wherein the plurality of electrical contact elements is fastened to the carrier body in the plurality of recesses.

7. The connecting element of claim 6, wherein the plurality of electrical contact elements is fastened in the plurality of recesses via a force fit.

8. The connecting element of claim 6, wherein the plurality of electrical contact elements is fastened in the plurality of recesses via a form fit.

9. The connecting element of claim 1, wherein the carrier body has a plurality of elongate fastening elements which are received in a corresponding plurality of openings in the plurality of electrical contact elements in order to fasten the plurality of electrical contact elements on the carrier body.

10. The connecting element of claim 9, wherein the plurality of elongate fastening elements extends transversely with respect to the contacting direction (K).

11. The connecting element of claim 1, wherein the plurality of electrical contact elements is respectively arranged elevated on at least one of the first and second contact sides of the carrier body.

12. The connecting element of claim 1, wherein at least one contact element of the plurality of contact elements is configured as an inner-conductor contact element, and wherein the remaining contact elements of the plurality of contact elements are configured as outer-conductor contact elements, which are arranged for electromagnetic shielding around the inner-conductor contact element.

13. A device arrangement comprising:

a first electrical device;

a second electrical device; and a connecting element including i) a carrier body having a first contact side and an opposite second contact side; and ii) a plurality of separate electrical contact elements, wherein each contact element of the plurality of contact elements is separate from the carrier body and includes a base body formed from an elastomer and an electrically conductive sheath arranged around the base body at least in sections, wherein the electrically conductive sheath provides a first contact region for electrically contacting the first electrical device and a second contact region for electrically contacting the second electrical device, the first contact region and the second contact region being electrically connected to one another, wherein each contact element of the plurality of contact elements is respectively coupled to the carrier body, such that the first contact region is electrically contactable from the first contact side of the carrier body and the second contact region is electrically contactable from the second contact side of the carrier body, wherein each contact element of the plurality of contact elements is configured resiliently along a contacting direction (K) running from the first contact region to the second contact region, to compensate for a tolerance-related distance offset between the first and second electrical devices, wherein the first electrical device has a set of first electrical contacts which contact the first contact regions of the plurality of electrical contact elements on the first contact side of the carrier body, wherein the second electrical device has a set of second electrical contacts which contact the second contact regions of the plurality of electrical contact elements on the second contact side of the carrier body, and wherein the electrically conductive sheath is at least one of, a metal foil, a metal sheet, or a combination thereof.

14. The device arrangement of claim 13, wherein at least one of the first and second electrical devices is fastened on the plurality of electrical contact elements of the connecting element by the respective electrical device's set of electrical contacts.

15. The device arrangement of claim 14, wherein at least one of the first and second electrical devices is fastened on the plurality of electrical contact elements of the connecting element by the respective electrical device's set of electrical contacts using a bonding material on the plurality of electrical contact elements.

16. The device arrangement of claim 15, wherein the bonding material is solder.

* * * * *